(12) United States Patent (10) Patent No.: US 6,658,691 B2
Muramatsu (45) Date of Patent: Dec. 9, 2003

(54) WIPER ARM WITH ROTATION RESTRICTION MEMBER

(75) Inventor: Masami Muramatsu, Hamana-gun (JP)

(73) Assignee: Asmo Co., Ltd., Shizuoka (JP)

( * ) Notice: Subject to any disclaimer, the term of this patent is extended or adjusted under 35 U.S.C. 154(b) by 75 days.

(21) Appl. No.: 10/108,393

(22) Filed: Mar. 29, 2002

(65) Prior Publication Data

US 2002/0144373 A1 Oct. 10, 2002

(30) Foreign Application Priority Data

Apr. 6, 2001 (JP) ....................................... 2001-108877
Oct. 26, 2001 (JP) ....................................... 2001-328982

(51) Int. Cl.[7] .............................. B60S 1/32; B60S 1/34
(52) U.S. Cl. .......................... 15/250.352; 15/250.351; 15/250.34; 15/250.19
(58) Field of Search ............... 15/250.351, 250.352, 15/250.34, 250.19, 250.31, 250.16

(56) References Cited

U.S. PATENT DOCUMENTS 2,230,596 A * 2/1941 Horton ................. 15/250.352
2,975,457 A * 3/1961 Scinta ................... 15/250.352
3,729,767 A * 5/1973 Edele et al. ............ 15/250.352

FOREIGN PATENT DOCUMENTS

| FR | 1232079 | * 8/1959 | ............... 15/250.34 |
| JP | U-63-30261 | 2/1988 | |
| JP | U-2-27957 | 2/1990 | |

* cited by examiner

Primary Examiner—Gary K. Graham
(74) Attorney, Agent, or Firm—Posz & Bethards, PLC

(57) ABSTRACT

In a wiper arm, a head cover detachably attached to an arm head has a stopper wall that protrudes inward from an end thereof and is inserted into a gap between the arm head and an arm member. When the arm member is rotated by a certain angle to the arm head in the direction away from the windshield glass, the stopper wall comes in contact with the arm member so that further rotation of the arm member is suppressed. Accordingly, a possible damage of the wiper arm due to a car washer, which accidentally turns the arm member to the lock back state, is avoided. On the other hand, if a user detaches the head cover from the arm head, the arm member can be manually rotated to the lock back state so that a blade rubber replacement operation for a maintenance purpose is easy.

21 Claims, 6 Drawing Sheets

WIPER ARM WITH ROTATION RESTRICTION MEMBER

CROSS REFERENCE TO RELATED APPLICATION

This application is based upon and claims the benefit of priority of Japanese Patent Applications No. 2001-108877 filed on Apr. 6, 2001 and No. 2001-328982 filed on Oct. 26, 2001, the contents of which are incorporated herein by reference.

BACKGROUND OF THE INVENTION

1. Field of the Invention

The present invention relates to a wiper arm having a rotation restriction member that prevents at user's choice an arm member pivotally connected to an arm head from rotating to a position where the arm member rests in place at a given angle to the arm head in a direction away from a windshield glass (in a lock back state).

2. Description of Related Art

A conventional wiper arm has an arm head fixed to a pivot shaft, an arm member hinged on a holding pin attached to the arm head so as to rotate by a given angle in a direction away from a windshield glass and a spring bridging between the arm head and the arm member for biasing the arm member toward the windshield glass so that a blade rubber of a wiper blade held by the arm member is pressed against the windshield glass.

It is well known to rotate the arm member by the given angle to the arm head in a direction away from the windshield glass and to make the arm member rest at a position where an end of the arm member comes in contact with the arm head, while the arm member is urged against the arm head by a biasing force of the spring. That is, the wiper arm is in a lock back state.

Further, JP-A-63-30261 proposes a wiper arm construction in which an arm member is held in a semi-lock state. This construction is applicable to a vehicle in which, when the arm member is rotated relative to the arm head, a base end portion of the arm member interferes with a periphery of an engine hood so that it is impossible to turn to the lock back state. According to JP-A-63-30261, after the arm member is rotated by a relatively small angle to the arm head in a direction away from the windshield glass, a spacer mounted in the wiper arm is moved manually so as to interpose itself between the arm member and the arm head. Accordingly, the spacer prevents a return rotation of the arm member due to a biasing force of a spring in a direction closer to the windshield glass. That is, the arm member rests in the semi-lock back state.

Recently, a wiper arm made of resin has been applied to the vehicle, in particular, to a rear windshield glass in view of more attractive appearance and lighter weight. Generally, this kind of wiper arm has a feature of enabling the lock back state for a purpose of maintenance such as a replacement of a blade rubber, unless the vehicle body has a limitation on realizing the same.

However, the conventional wiper arm constructed for enabling the lock back state has a drawback that, if an outside force more than the spring biasing force urging the arm member toward the windshield glass acts on the arm member in a direction away from the windshield glass, the arm member is brought into the lock back state. For example, when the vehicle is washed with a car washer, a washer tool such as a mop and a brush may cling accidentally to the arm member and turn the arm member to the lock back state. The washing operation, if continued in the lock back state, is prone to cause the wiper arm to be damaged.

On the other hand, there is known a wiper arm in which an arm member is pivotally connected to an arm head but can neither rest in the lock back state nor rest in the semi-lock back state. That is, though the arm member can be rotated in a direction away from the windshield glass, the arm member returns to an original position due to a spring biasing force unless continuously held by hand. This construction gives the user an inconvenience on performing the maintenance mentioned above.

SUMMARY OF THE INVENTION

An object of the invention is to provide a wiper arm in which a user can switch over at choice from a first operation mode that prohibits the arm member from moving to the lock back state to a second operation mode that allows an arm member to move to and rest in the lock back state. Accordingly, if the user selects the second operation mode and moves manually the arm member to the lock back state, a maintenance is easily performed and, if the user selects the first operation mode, a damage of the wiper arm due to an accidental movement of the arm member to the lock back state is avoided.

To achieve the above object, in a wiper arm having an arm head whose end is to be fixed to a pivot shaft and whose the other end has a holding axis, an arm member whose end is pivotally connected to the arm head so as to rotate about the holding axis in a direction away from the windshield glass and whose the other end is to be connected with a wiper blade, and a biasing member bridging between and retained by the arm head and the arm member for biasing the arm member toward the windshield glass so that the wiper blade may be pressed against the windshield glass, the biasing member is so operative that the arm member rests at a position where the arm member comes in contact with the arm head, when the arm member is rotated beyond a given angle to the arm head in the direction away from the windshield glass, and returns to an original position, when the arm member is rotated within the given angle to the arm head in the direction away from the windshield glass.

In the wiper arm mentioned above, a rotation restriction member is attached to at least one of the arm head and the arm member so that a position of the rotation restriction member relative thereto is changed over at user's choice from a first position, where the rotation restriction member restricts the arm member to the rotation only within the given angle to the arm head, to a second position, where the rotation restriction member allows the rotation of the arm member beyond the given angle to the arm head.

If the user selects the first position, when the vehicle is washed with a car washer, a possible damage of the wiper arm due to a washer tool such as a mop and a brush, which may cling accidentally to the arm member and turn the arm member to the lock back state, is avoided.

On the other hand, if the user selects the second position, the arm member is manually rotated to the lock back state, when necessary, so that a blade rubber or an arm blade replacement operation for a maintenance purpose is easy or the blade rubber deformation or freezing is prevented.

Preferably, the rotation restriction member is a head cover detachably attached to the arm head. The head cover has a stopper wall that comes in contact with the arm member, when the arm member is rotated relative to the arm head in the direction away from the windshield glass. Accordingly, the change from the first position to the second position is executed by detaching the head cover from the arm head so that the stopper wall does not come in contact with the arm member.

As an alternative, the rotation restriction member is a head cover whose end is pivotally connected to an end of the arm head. The head cover has as topper wall that comes in contact with the arm member, when the arm member is rotated relative to the arm head in the direction away from the windshield glass. Accordingly, the change from the first position to the second position is executed by changing an inclination angle of the head cover to the arm head so that the stopper wall does not come in contact with the arm member.

It is preferable that the stopper wall, which protrudes inward from an end of the head cover, is inserted into a gap between the arm head and the arm member at the first position and does not exist in the gap at the second position.

As another alternative, the rotation restriction member is a cap rotatably attached to a fastener by which the arm head is to be fixed to the pivot shaft. The cap covers the fastener and has a stopper surface that interferes with the arm member, when the arm member is rotated relative to the arm head in the direction away from the windshield glass. Accordingly, the change from the first position to the second position is executed by changing the angular phase of the cap relative to the fastener so that the stopper surface does not interfere with the arm member.

It is preferable that the cap is provided at a circumference thereof with the stopper surface having a notch and, at the second position, the notch is oriented to face the end of the arm member or with a protruding portion that constitutes the stopper surface and, at the first position, the protruding portion is orientated to face the end of the arm member.

As further alternative, the rotation restriction member is a head cover whose one portion is pivotally connected to the arm member and whose the other portion is engaged with the arm head. The head cover has an end periphery that interferes with the arm member, when the arm member is rotated relative to the arm head in the direction away from the windshield glass. Accordingly, the change from the first position to the second position is executed by releasing the engagement of the head cover with the arm head and rotating the head cover hinged on the arm member so that the end periphery of the head cover does not interfere with the arm member.

BRIEF DESCRIPTION OF THE DRAWING

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS (First Embodiment)

A wiper arm according to a first embodiment of the present invention is described with reference to FIGS. 1 to 6.

Figure 5:
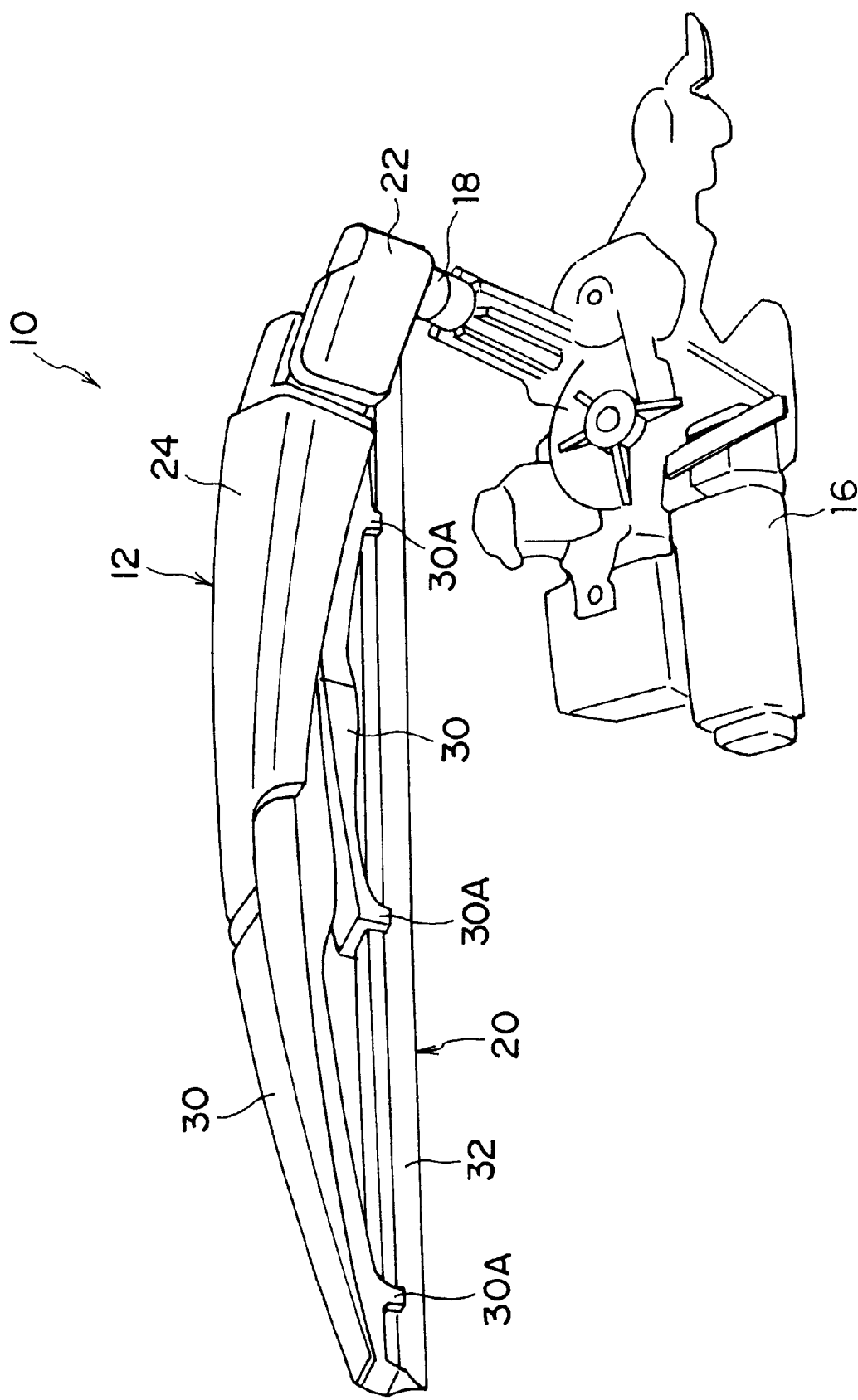
FIG. 5 is a perspective view of a rear wiper device incorporating the wiper arm according to the first embodiment.
Figure 6:
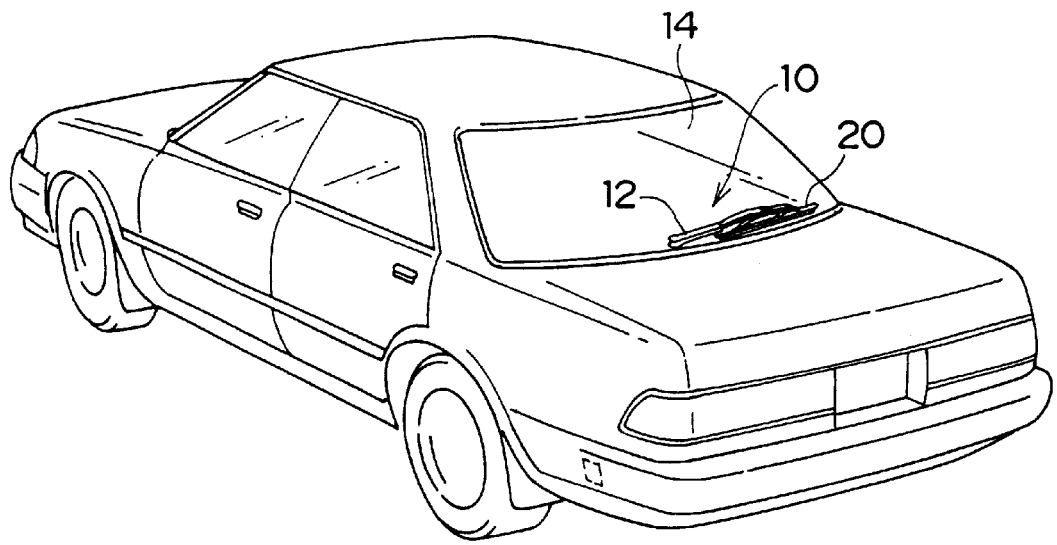
FIG. 6 is a perspective view of a vehicle mounting the rear wiper device of FIG. 5.

As shown in FIG. 6, a rear wiper device 10 is positioned in a center of a lower periphery of a rear windshield glass. As shown in FIG. 5, the rear wiper device 10 is composed of a rear wiper motor 16 as a drive power source, a pivot shaft driven by the rear motor 16 to rotate about an axis thereof at a lower speed than that of the rear motor 16, a wiper arm fixed to an end of the pivot shaft 18 for making a swing movement above a surface of the rear windshield glass, and a wiper blade 20 connected to an end of the wiper arm 12 for wiping the surface of the rear windshield glass 14.

Figure 1:
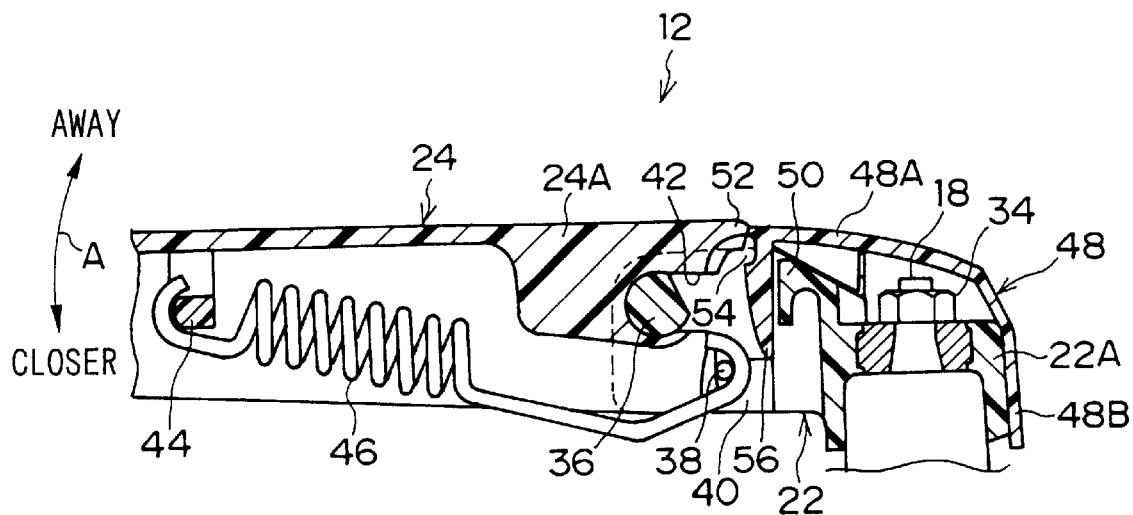
FIG. 1 is a partly enlarged cross sectional view of a wiper arm showing a normal wiping state according to a first embodiment of the present invention.
Figure 2:
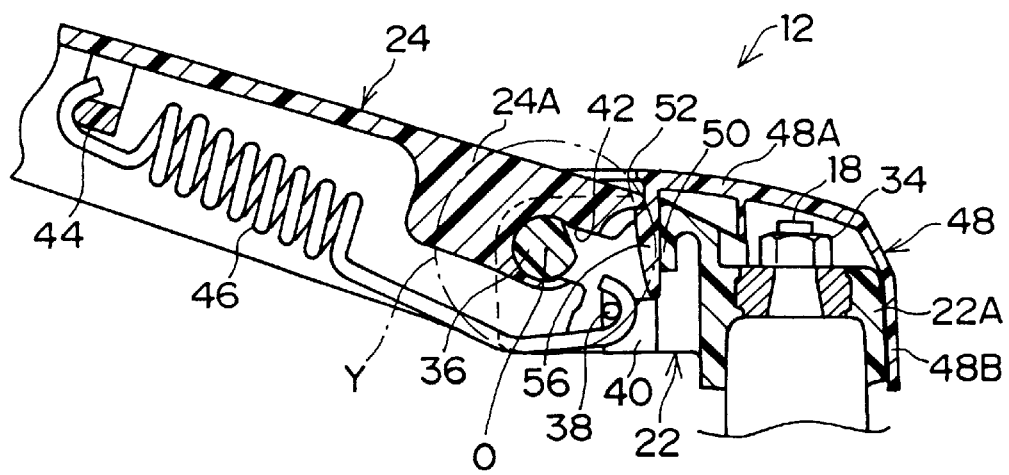
FIG. 2 is a partly enlarged cross sectional view of the wiper arm showing a restriction of lock back state according to the first embodiment.
Figure 3:
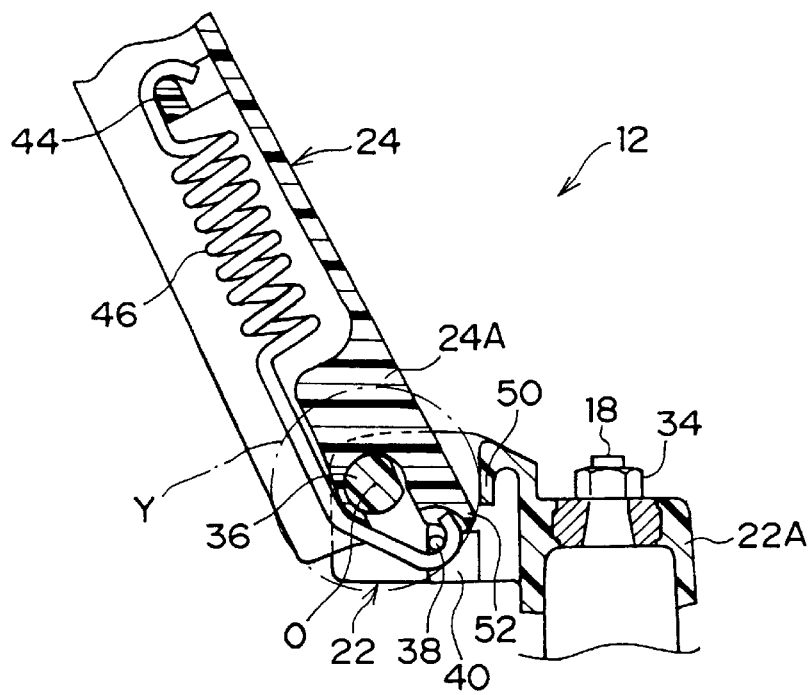
FIG. 3 is a partly enlarged cross sectional view of the wiper arm showing the lock back state according to the first embodiment.

As shown in FIGS. 1 to 3, the wiper arm 12, which is made of resin, is composed of an arm head 22 fixed to the pivot shaft 18 and an arm member 24 whose one end is connected pivotally to the arm head 22 to rotate in a direction away from the windshield glass and whose the other end is pivotally connected the wiper blade 20. The wiper blade 20 is of a tournament type in which an elongated blade rubber 32 is held by a plurality of claws 30A formed at each periphery of a plurality of levers 30.

A base end 22A of the arm head 22, which is made of resin, is fitted to the end of the pivot shaft 18 and fixed thereto by a fastening nut 34. The arm head 22 is provided at a front end thereof with a holding pin (hinge shaft) 36 whose axis extends perpendicularly to a direction in which both side walls thereof extend longitudinally and, further, integrally provided beneath an end periphery of the arm member 24 on a side of the arm head 22 with a pedestal 40 with a pin shaped spring retainer 38.

The arm member 24, which is of an elongated shape and made of resin, is connected to the front end of the arm head 22. A cross section of the arm member 24 is formed in shape of square whose bottom side is opened. A base end 24A of the arm member 24 whose wall thickness is thicker is provided with a U shaped notch 42 into which the holding pin 36 of the arm head 22 is inserted. Further, the arm member 24 is integrally provided at middle thereof with a U shaped spring retainer 44 protruding downward from a top wall thereof. In a state that the holding pin 36 is fitted in the notch 42, a spring(expansion coil spring) 46 for biasing the arm member 25 is retained between the pin shaped spring retainer 38 and the U shaped spring retainer 44. The arm member 24 is connected to the holding pin 36 to rotate about an axis thereof in a direction away from the windshield glass (an arrow A direction in FIG. 1). A line connecting the spring retainers 38 and 44 is positioned beneath the holding pin 36 so that the arm member 24 is biased toward the windshield glass by the spring 46 when the wiper blade 30 wipes the windshield glass.

As shown in FIGS. 1 and 2, a head cover 48, which is made of resin, is detachably mounted on the arm head 22. The head cover 48 is provided with a top wall portion 48A for covering in a plane view the arm head 22 extending from a vicinity of the fastening nut 34 toward the front end thereof and a circumferential wall portion 48B bending downward from a periphery of the top wall portion 48A for covering a vicinity of the base end 22A of the arm head 22. Further, the top wall portion 48A is integrally provided on a side of a front end thereof with a stopper wall 56 protruding perpendicularly in a gap between a reverse U shaped vertical wall 50 formed in a middle of the arm head 22 and a base end upper periphery 52 (above the notch 42) of the arm member 24.

As shown in FIG. 2, the stopper wall 56 has a recess or step that is positioned on an orbit Y (a circle whose center is a point O) of the base end upper periphery 52 of the arm member 24 circling around the holding pin 36. Accordingly, when the head cover 48 is mounted on the arm head 22, the base end upper periphery 52 comes in contact with (interferes with) the stopper wall 56 (the recess or step thereof). Further, as shown in FIG. 3, the pedestal 40 is also positioned on the orbit Y of the base end upper periphery 52 of the arm member 24 circling around the holding pin 36 so that, when the head cover 48 is detached from the arm head 22, the base end upper periphery 52 comes in contact with (interferes with) the pedestal 40.

Figure 4:
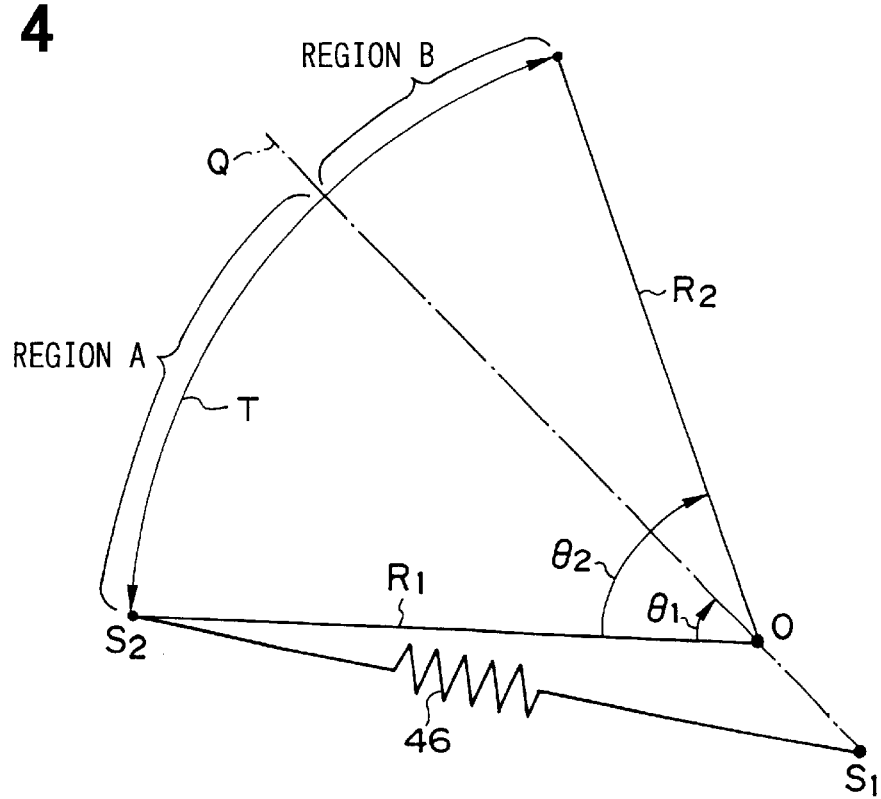
FIG. 4 is a schematic view of the wiper arm on which a biasing force acts according to the first embodiment.

FIG. 4 shows a schematic view of the rotation of the arm member 24 about the holding pin 36. The point O corresponds to a position of the holding pin 36 and points $S_1$ and $S_2$ show operation points of the biasing force of the spring 46 and correspond to positions of the spring retainers 38 and 44.

In a normal wiping state that the wiper blade 20 is in contact with the windshield glass, the line connecting the spring retainers 38 and 44 is positioned below the holding pin 36 so that the arm member 24 is biased toward the windshield glass by the spring 46. In the wiping state, the head cover 48 is mounted on the arm head 22 so that the wiper arm 12 shows a better appearance from a designing standpoint.

When the vehicle, in which the wiper arm 12 is in the wiping state, is washed with the car washer, the washer tool such as the mop and the brush may cling accidentally to the wiper arm 12, as described in a column of the related art of the present specification, and urge the arm member 24 to rotate relative to the arm head 22 in the direction away from the windshield glass, as shown in FIG. 2.

However, the base end upper periphery 52 of the arm member 24 comes in contact (interferes) with the stopper wall 56 positioned in the gap between the vertical wall 50 and the base end upper periphery 52 so that the rotation of the arm member 24 in the direction away from the windshield glass is suppressed. Even if stronger force urges the arm member 24 to rotate in the direction away from the windshield glass, the recess or step of the stopper wall 56 prevents the arm member 24 from further rotating in the direction away from the windshield glass since the recess or step of the stopper wall 56 is positioned on the orbit Y of the base end upper periphery 52 circling around the holding pin 36.

As mentioned above, according to the first embodiment, the arm member 24 never moves to the lock back state without a user's intention, for example, when the vehicle is washed with the car washer, so that the wiper arm 12 is hardly damaged by the map or the brush which may bring the arm member 24 to the lock back state accidentally.

Further, as shown in FIG. 3, the head cover 48 is manually detached from the arm head 22 when the user wishes to turn the wiper arm 12 to the lock back state for the purpose of replacing the blade rubber 32 of the wiper blade 20 as the maintenance, or preventing the blade rubber 32 from deforming (deteriorating) due to aging or from freezing in an aim of a longer endurance or accurate operation. Since the head cover 48 is resiliently fixed to the arm head 22 or the fastening nut 34 (by resiliently deforming resin projections provided in the head cover 48), it is easy to detach the head cover 48 from the arm head 22.

After detaching the head cover 48, the arm member 24 can be manually rotated around the holding pin 36 in the direction away from the windshield glass. At this time, As shown in FIG. 4, only the point $S_2$ corresponding to the position of the spring retainer 44 rotates about the point O corresponding to the position of the holding pin 36 to draw a circle T as a moving orbit, since the point O and the point $S_1$ corresponding to the position of the spring retainer 38 are fixed.

When the arm member 24 rotates in the direction away from the windshield glass by an angle $\theta_1$, three points consisting of the point O, the point $S_1$ and the point $S_2$ are aligned in a straight line. After exceeding the angle $\theta_1$, the biasing direction of the spring 46 turns over from the direction toward the windshield glass to the direction away from the windshield glass. That is, as shown in FIG. 4, in a region A of the arm member 24 from a position $R_1$, where the arm member 24 is in the wiping state, to a position Q, where the arm member 24 is in a critical state (that is, within the angle $\theta_1$), the arm member 24 is biased toward the windshield glass. In a region B from the position Q to a position $R_2$, where the arm member 24 is in the lock back state(that is, within an angle $\theta_2$-$\theta_1$), the arm member 24 is biased in the direction away from the windshield glass.

Once the wiper member 24 exceeds the position Q, the biasing direction of the spring 46 turns over to the direction away from the windshield glass so that the wiper member 24 is forced to rotate along the circle T by an angle $\theta_2$ until the base end upper periphery 52 of the arm member 24 comes in contact with an upper surface of the pistol 40, that is, until the arm member 24 reaches the lock back state.

As mentioned above, the wiper arm 12 according to the first embodiment has a rotation restriction member that is the head cover 48 provided at the end thereof with the stopper wall 56 and it is selected by a user's choice whether the rotation restriction member is in an operative state or not. That is, when the user mounts the head cover 48 on the wiper arm 12, the arm member 24 is movable only within the region A until the base end upper periphery 52 comes in contact with the stopper wall 56 so that, even if the arm member 24 is accidentally rotated by an outside force applied thereto, the arm member 24 is returned by the biasing force of the spring 46 to the original position where the wiper arm 12 is in the wiping state and never turns to the lock back state. The rotation restriction member is effective for avoiding the possible damage of the wiper arm 12 due to the outside force.

On the other hand, when the user detaches the head cover 48 from the wiper arm 12 for the purpose of maintenance, the arm member 24 is movable within the regions A and B so that, if the arm member 24 is rotated manually until exceeding the critical position Q, the arm member 24 is urged to rotate in the direction away from the windshield glass by the biasing force of the spring 46 so as to rest in the lock back state at the position where the base end upper periphery 52 comes in contact with the pedestal 40.

Further, as a second advantage, the wiper arm 12 according to the first embodiment can keeps better appearance, since the stopper wall 56 is formed to protrude inward from the front end of the top wall portion 48A, which is out of view in appearance.

Furthermore, as a third advantage, the arm member 24 made of resin is weaker in strength, compared with that made of metal so that the rotation restriction member that prevents the arm member 24 from accidentally turning to the lock back state is more meaningful in view of avoiding a risk of the damage thereof due to the outside force on washing the vehicle.

Moreover, as a fourth advantage, in the wiper arm 12 applied to the rear wiper device 10, the rotation restriction member for preventing the arm member 24 from accidentally rotating to the lock back state is more effective since the arm member 24 moving on the rear windshield glass nearly parallel to the gravity direction is likely caught by the mop or the brush moving nearly perpendicularly to the gravity direction on washing the vehicle with the car washer.

(Second Embodiment)

Figure 7:
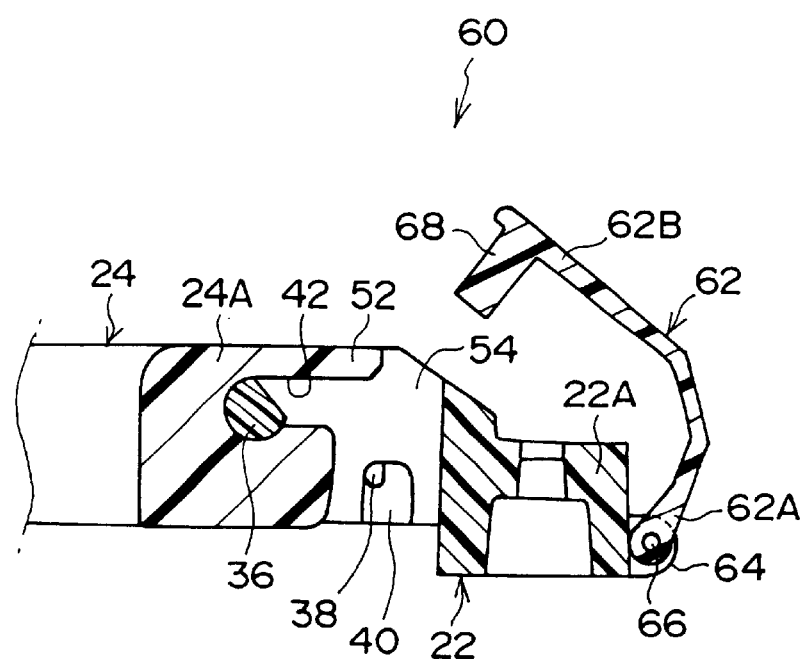
FIG. 7 is a partly enlarged cross sectional view of the wiper arm according to a second embodiment of the present invention.

A wiper arm 60 according to a second embodiment is described with reference with FIG. 7. The wiper arm 60 has a resin head cover 62 hinged on the arm head 22, which is different from the head cover 48 of the wiper arm 12 according to the first embodiment.

The arm head 22 is integrally provided at a base end 22A thereof with a pair of a semi-circular shaped installation legs 64. A base end portion 62A of the head cover 62 is pivotally connected via a hinge pin 66 to the installation legs 64. Accordingly, the head cover 62 can not come off from the arm head 22, though the head cover 62 rotates about the hinge pin 66. The head cover 48 is integrally provided at a front end portion 62B thereof with a stopper wall 68 whose thickness is relatively thick. The stopper wall 68 is inserted into the gap 54 between the front end 22A of the arm head 22 and the base end upper periphery 52 of the arm member 24 when the head cover 62 is in a close state (by rotating the head cover 62 about hinge pin 66 in a direction closer to the arm head 22).

The head cover 62 is in the close state at a normal operation of the wiper arm 60. At this normal operation, when the arm member 24 is rotated around the holding pin 36 in the direction away from the windshield glass, the rotation of the arm member 24 is suppressed after the base end upper periphery 52 of the arm member 24 comes in contact with the stopper wall 68. On the other hand, when the head cover 62 is rotated about the hinge pin 66 away from the arm head 22 for the purpose of maintenance, that is, when the head cover 62 is moved to an open state, the stopper wall 68 is positioned outside the gap 54, so the wiper arm 60 can turn to the lock back state.

The head cover 62 constitutes the rotation restriction member for selectively preventing the rotation of the arm member 24 in the direction away from the windshield glass. The user can prohibit or allow the lock back state at choice by moving the head cover 62 to the open or close state. Accordingly, the maintenance is facilitated by intentionally allowing the lock back state and the possible damage of the wiper arm 60 due to the accidental lock back state is avoided by prohibiting the lock back state.

Further, since the wiper arm 60 is similar to the wiper arm 15 according to the first embodiment except the head cover 62 switched to the open or close state at choice, the second embodiment has the same advantages as the first to fourth advantages mentioned in the first embodiment.

Furthermore, the wiper arm 60 has an advantage that, since the head cover 62 is pivotally connected to the arm head 22 and is not detached easily from the arm head 22, the head cover 62 is hardly lost, even if an outside force is applied to the head cover 62 due to some reasons.

(Third Embodiment)

A wiper arm 70 according to a third embodiment is described with reference to FIGS. 8 and 9. The wiper arm 70 has a resin head cover 72 hinged on the arm member 24, which is different from the head cover 48 of the wiper arm 12 according to the first embodiment.

The head cover 72 is formed in shape of rectangular box whose side facing the arm member 24 and whose bottom side are opened (cross section in a longitudinal direction is formed substantially in letter L shape). The head cover 72, which is made of resin, has a top wall portion 72A and a circumferential wall portion 72B.

The head cover 72 is provided inside the circumferential wall portion 72 on a side of the arm member 24 with a pair of holding pins 74 opposed to each other and coaxially protruding in a direction closer to each other. The arm member 24 is provided at both walls of the base end portion 24A with a pair of pin holes 76. The head cover 72 is pivotally connected to the arm member 24 by inserting the holding pins 74 into the pin holes 76. Further, the head cover is provided inside middle lower peripheries of the circumferential wall portion 72B with a pair of projections 78. The arm head 22 is provided at the opposite lower peripheries of the side wall thereof with rectangular shaped notches 80 into which the projections 78 are fitted by once deforming resiliently the circumferential wall portion 24B. When the head cover 72 is in a close state, the projections 78 are fitted into the notches 80 so that the head cover 72 is prevented from turning to an open state accidentally.

Moreover, the head cover 72 is integrally provided at a middle back surface of the top wall portion 72A with a tongue shaped protrusion 82. The arm head 22 is provided at a middle thereof with a projection 84 whose upper periphery is bent at a given inclination angle. When the head cover 72 is in the close state, the protrusion 82 is engaged with the projection 84.

The arm member is integrally provided at the base end portion 24A with a step 86 whose height corresponds substantially to a plate thickness of the head cover 72. When the head cover 72 is at the close state, the step 86 serves to make an upper surface of the head cover 72 substantially coincide in height with an upper surface of the arm member 24. When the head cover 72 is at the close state, a front end of the top wall portion 72A of the head cover 72 and the step 86 of the arm member 24 are positioned to face each other with a gap 90 therebetween.

At a normal wiping operation, the head cover 72 is in the close state. When the arm member 24 is rotated around the holding pin 36 by a certain angle to the arm head 22 in the direction away from the windshield glass, the step 86 comes in contact with the front end of the top wall portion 72A of the head cover 72 and the protrusion 82 of the head cover 72 comes in deeper engagement with the projection 84 of the arm head 22 so that further rotation of the arm member 24 in the direction away from the windshield glass is suppressed.

Figure 8:
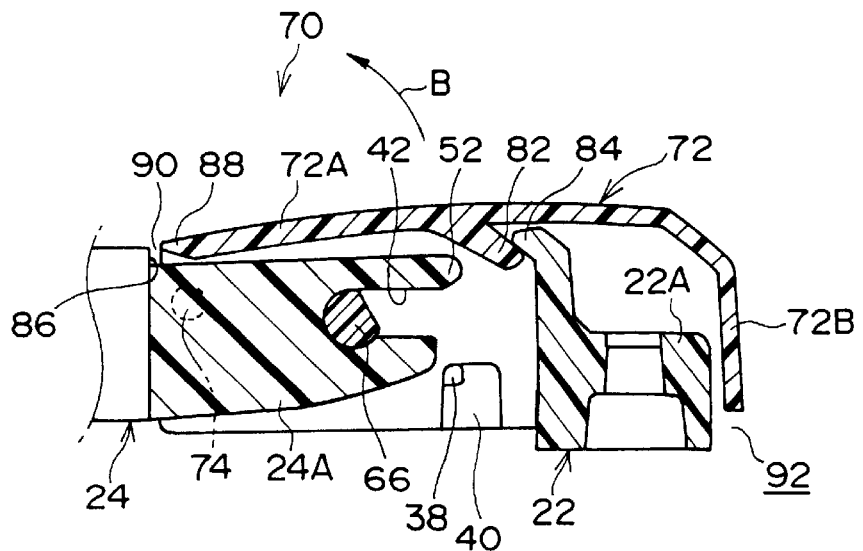
FIG. 8 is a partly enlarged cross sectional view of the wiper arm according to a third embodiment of the present invention.
Figure 9:
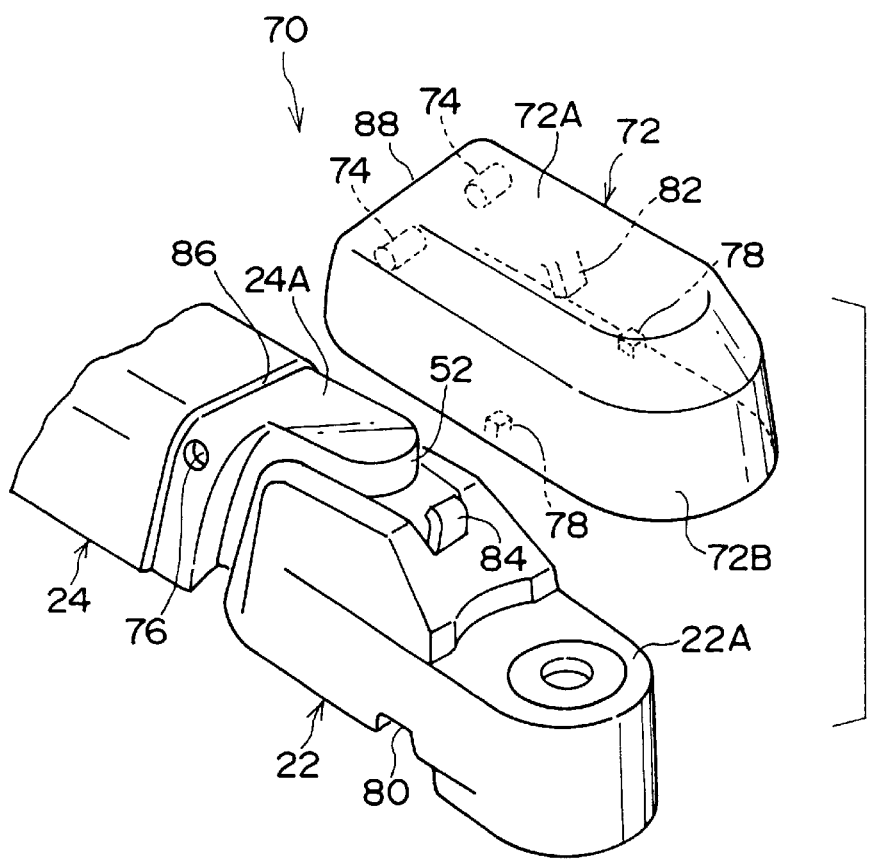
FIG. 9 is a perspective view of a head cover detached from an arm head in the wiper arm of FIG. 8.

On the other hand, when the user wishes to turn the wiper arm 70 to the lock back state for the maintenance, the head cover 72 is opened (in the open state) by detaching the projections 78 of the head cover 72 from the notches 80 and rotating the head cover 72 around the holding pins 74 in a direction shown by an arrow B in FIG. 8.

The user can prohibit or allow the lock back state at choice by turning the head cover 72 to the open or close state. Accordingly, the maintenance is facilitated by allowing intentionally the lock back state and the possible damage of the wiper arm 60 due to the unintentional lock back state is avoided by prohibiting the lock back state.

Further, since the wiper arm 70 is similar to the wiper arm 15 according to the first embodiment except the head cover 72 switched to the open or close state at choice, the third embodiment has the same advantages as the first to fourth advantages mentioned in the first embodiment.

Furthermore, the wiper arm 70 has an advantage that, since the head cover 72 is pivotally connected to the arm head 22 and can not be detached easily from the arm head 22, the head cover 72 is hardly lost, even if an outside force is applied to the head cover 72 due to some reasons, similarly as the second embodiment.

Moreover, according to the third embodiment, since the head cover 72 is hinged on the arm member 24 and opened in the direction shown by the arrow B, it is not necessary that a space 92 on a back side of the base end portion 22A of the arm head 22 is large. Accordingly, the wiper arm 70 is more effectively applicable to the vehicle in which a volume of the space 90 is limited.

(Fourth Embodiment)

Figure 10:
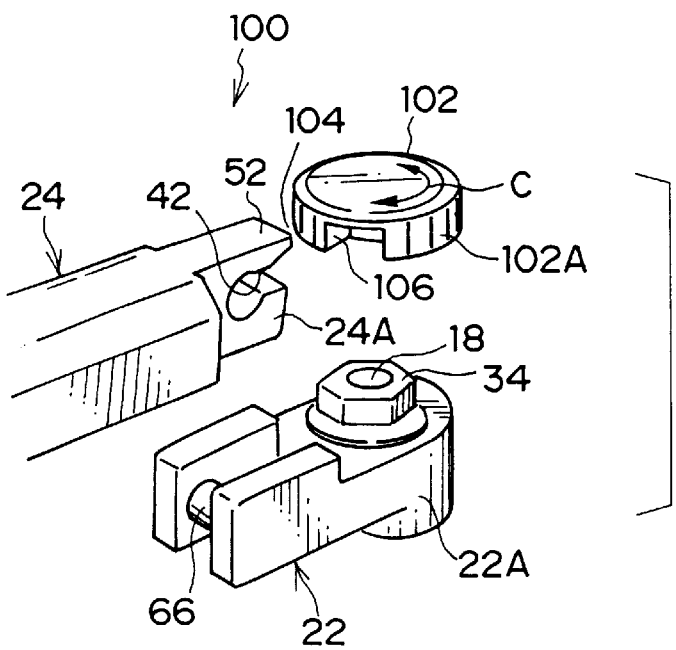
FIG. 10 is a partly enlarged exploded perspective view of a wiper arm according to a fourth embodiment of the present embodiment.

A wiper arm 100 according to a fourth embodiment is described with reference to FIGS. 10 and 11. The wiper arm 100 has a cap 102 instead of the head cover 48 according to the first embodiment.

The arm head 22 is fixed to the pivot shaft 18 by the fastening nut 34 as a fastener. The head cover 100, which is made of resin, is attached to the fastening nut 34 so as to cover the same without covering an entire surface of the arm head 22 as in the first embodiment. The cap 102 is integrally provided at aback surface with a plurality of projections extending axially, which are resiliently fitted to the fastening nut 34*t*. The cap 102 is attached to the fastening nut 34 just by being put on and pushed toward the fastening nut 34.

The cap 102 has a cylindrical circumferential portion 102A as the stopper surface. When the cap 102 is attached to the fastening nut 34, there is provided with a gap 104 between the base end upper periphery 52 of the arm member 24 and the circumferential portion 102A of the cap 102. The cap 102 is rotatable relative to the fastening nut 34 in both directions clockwise and counter-clockwise (direction shown by an arrow C in FIG. 10).

Further, the circumferential portion 102A of the cap 102 is provided at a given position with a rectangular shaped notch 106 whose width is slightly larger than width of the base end upper periphery 52.

When the wiper arm 100 is at a normal wiping operation, the cap 102 is positioned at a given angular phase position relative to the fastening nut 34 where the notch 106 does not face the base end upper periphery 52. If the arm member 24 is rotated around the holding pin 36 by a certain angle to the arm head 22 in the direction away from the windshield glass, the base end upper periphery 52 comes in contact with the circumferential portion 102A, since the circumferential portion 102A is on the orbit Y of the base end upper periphery 52 circling around the holding pin 36, so that further rotation of the arm member 24 is suppressed.

On the other hand, when the user wishes to turn the wiper arm 100 to the lock back state for the maintenance, the cap 102 is rotated to another angular phase position relative to the fastening nut 34 where the notch 106 faces the base end upper periphery 52 so that, when the arm member 24 is manually rotated in the direction away from the windshield glass, the base end upper periphery 52 passes through the notch 52 does not interfere with the circumferential portion 102.

As mentioned above, the cap 102 constitutes the rotation restriction member. The user can prohibit or allow the lock back state at choice by rotating the cap 102 from one angular phase to the other angular phase relative to the fastening nut 34. Accordingly, the maintenance is facilitated by allowing lock back state and the possible damage of the wiper arm 60 due to the unintentional lock back state is avoided by prohibiting the lock back state.

Further, the fourth embodiment has the same advantages as the first to fourth advantages mentioned in the first embodiment.

Furthermore, since the cap 102, which is slightly larger than the fastening nut 34, is compact, the wiper arm 100 can be manufactured at less cost.

Moreover, a change from the first operation mode to the second operation mode with respect to the rotation restriction member is executed just by rotating the cap 102 relative to the fastening nut 34, which is a simpler operation, compared with the operation of detaching the head cover from the arm head according to the first embodiment or the operation of opening or closing the head cover hinged on the arm head or the arm member according to the second or third embodiment.

Figure 11:
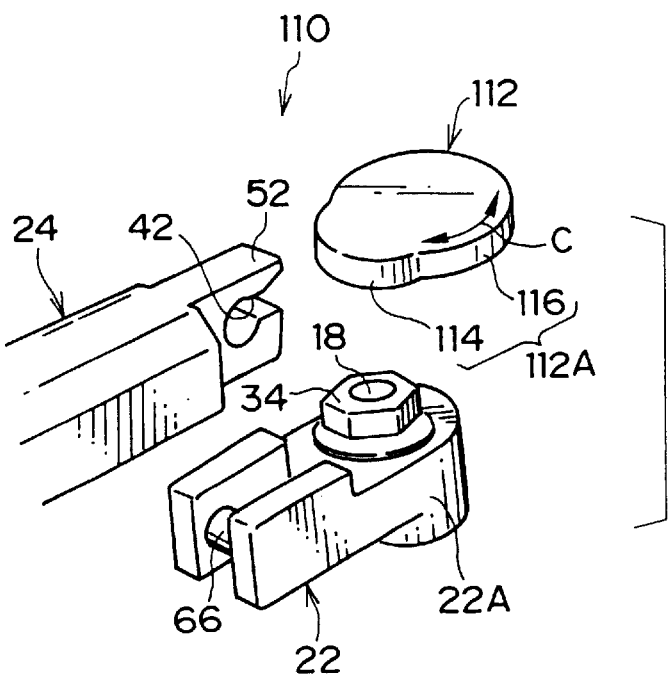
FIG. 11 is a partly enlarged exploded perspective view of a modification of the wiper arm according to the fourth embodiment.

As a modification of the wiper arm 100 having the cap 102 provided with the notch 106, a wiper arm 110 may have a cap 112 as shown in FIG. 11. The cap 112 is integrally provided at a circumference thereof with a protruding circumferential portion 114 extending radially outward, as the stopper surface. A circumferential wall portion 122A is composed of the protruding circumferential portion 114 and a general circumferential portion 116 of the cup 112 excluding the protruding circumferential portion 114.

When the wiper arm 110 is at a normal wiping operation, the cap 112 is positioned at a given angular phase position relative to the fastening nut 34 where the protruding circumferential portion 114 faces the base end upper periphery 52 of the arm member 24. If the arm member 24 is rotated around the holding pin 36 by a certain angle to the arm head 22 in the direction away from the windshield glass, the base end upper periphery 52 comes in contact with the protruding circumferential portion 114 so that further rotation of the arm member 24 is suppressed. On the other hand, when the user manually rotate the cap 112 relative to the fastening nut 34 so that the general circumferential portion 116 faces the base end upper periphery 52 of the arm member 24, the general circumferential portion 116 does not interfere with the base end upper periphery 52, when the user rotates manually the arm member 24 in the direction away from the windshield glass, so that the wiper arm 110 turns to the lock back state.

In the fourth embodiment, instead of fixing the arm head 22 to the pivot shaft 18 by the fastening nut 34, the arm head 22 may be fixed to the pivot shaft 18 in such a manner that a bolt with a head, as the fastener, is screwed via the arm head 22 into a weld nut bonded to a top of the pivot shaft 18. In this case, the cap 102 or 112 may cover the head of the bolt.

Further, instead of rotating the cap 102 or 112 relative to the fastener, the cap 102 or 112 may be once detached from the fastener and, again, attach to the fastener with a different angular phase to the fastener, when the user selects a first position allowing the lock back state or a second position prohibiting the lock back state.

In the first to fourth embodiment, the wiper arm may be applied not only to the rear wiper device but also to a front wiper device.

Further, material of the arm head 22 and the arm member 24 are not limited to resin but may be metal. Furthermore, the arm member is not limited to an integrated body made of resin but may be composed of a plurality of bodies such as a retainer and an arm piece.

What is claimed is:

1. A wiper arm to be fixed to and driven by a pivot shaft for making a wiper blade wipe a windshield glass, comprising:
   an arm head whose one end is to be fixed to the pivot shaft and whose other end has a holding axis;
   an arm member whose one end is pivotally connected to the arm head so as to rotate about the holding axis in a direction away from the windshield glass and whose other end is to be connected with the wiper blade;
   a biasing member bridging between and retained by the arm head and the arm member for biasing the arm member toward the windshield glass so that the wiper blade may be pressed against the windshield glass, the biasing member causing the arm member to rest at a position where the arm member comes in contact with the arm head, when the arm member is rotated beyond a given angle to the arm head in the direction away from the windshield glass, and to return to an original position, when the arm member is rotated within the given angle to the arm head in the direction away from the windshield glass; and
   a rotation restriction member attached to at least one of the arm head and the arm member, a position of the rotation restriction member relative to the at least one of the arm head and the arm member being changed over at user's choice from a first position, where the rotation restriction member restricts the arm member to the rotation only within the given angle to the arm head, to a second position, where the rotation restriction member allows the rotation of the arm member beyond the given angle to the arm head.

2. A wiper arm according to claim 1, wherein a change from the first position to the second position is executed by detaching the rotation restriction member detachably attached to the at least one of the arm head and the arm member at the first position therefrom.

3. A wiper arm according to claim 2, wherein the rotation restriction member is a head cover, which is detachably attached to the arm head, having a stopper wall that comes in contact with the arm member at the first position, when the arm member is rotated relative to the arm head in the direction away from the windshield glass, and the change from the first position to the second position is executed by detaching the head cover from the arm head so that the stopper wall does not come in contact with the arm member.

4. A wiper arm according to claim 3, wherein the stopper wall, which is formed integrally with the head cover so as to protrude inward from an end thereof, is inserted into a gap between the arm head and the arm member at the first position and does not exist in the gap at the second position.

5. A wiper arm according to claim 2, wherein the arm head is provided with a fastener by which the end of the arm head is to be fixed to the pivot shaft and, further, wherein the rotation restriction member is a cap, which is detachably attached to the fastener for covering the fastener, having a stopper surface which interferes with the arm member at the first position, when the arm member is rotated relative to the arm head in the direction away from the windshield glass, and the change from the first position to the second position is executed by once detaching the cap from the fastener and again attaching the same to the fastener with the different angular phase of the cap relative to the fastener so that the stopper surface does not interfere with the arm member.

6. A wiper arm according to claim 1, wherein the rotation restriction member is rotatable on the at least one of the arm head and the arm member and a change from the first position to the second position is executed by changing an angular phase of the rotation restriction member relative to the at least one of the arm head and the arm member.

7. A wiper arm according to claim 6, wherein the arm head is provided with a fastener by which the end of the arm head is to be fixed to the pivot shaft and, further, wherein the rotation restriction member is a cap, which is rotatably attached to the fastener for covering the fastener, having a stopper surface which interferes with the arm member at the first position, when the arm member is rotated relative to the arm head in the direction away from the windshield glass, and the change from the first position to the second position is executed by changing the angular phase of the cap relative to the fastener so that the stopper surface does not interfere with the arm member.

8. A wiper arm according to claim 7, wherein the cap is provided at a circumference thereof with the stopper surface having a notch and, at the second position, the notch is oriented to face the end of the arm member.

9. A wiper arm according to claim 7, wherein the cap is provided at a circumference thereof with a protruding portion that constitutes the stopper surface and, at the first position, the protruding portion is orientated to face the end of the arm member.

10. A wiper arm according to claim 1, wherein the rotation restriction member is pivotally connected to the at least one of the arm head and the arm member and a change from the first position to the second position is executed by changing an inclination angle of the rotation restriction member to the at least one of the arm head and the arm member.

11. A wiper arm according to claim 10, wherein the rotation restriction member is a head cover, whose end is pivotally connected to an end of the arm head, having a stopper wall that comes in contact with the arm member at the first position, when the arm member is rotated relative to the arm head in the direction away from the windshield glass, and the change from the first position to the second position is executed by changing an inclination angle of the cover head to the arm head so that the stopper wall does not come in contact with the arm member.

12. A wiper arm according to claim 11, wherein the stopper wall, which is formed integrally with the head cover so as to protrude inward from the other end thereof, is inserted into a gap between the arm head and the arm member at the first position and does not exist in the gap at the second position.

13. A wiper arm according to claim 1, wherein the rotation restriction member is engaged with both of the arm head and the arm member at the first position and a change from the first position to the second position is executed by releasing an engagement of the rotation restriction member with one of the arm head and the arm member.

14. A wiper arm according to claim 13, wherein the rotation restriction member is a head cover, whose one portion is pivotally connected to the arm member and whose the other portion is engagable with the arm head, having an end periphery that interferes with the arm member at the first position, when the arm member is rotated relative to the arm head in the direction away from the windshield glass, and the change from the first position to the second position is executed by releasing the engagement of the head cover with the arm head and rotating the head cover hinged on the arm member so that the end periphery of the head cover does not interfere with the arm member.

15. A wiper arm according to claim 1, wherein the arm member is made of resin.

16. A wiper arm according to claim 1, wherein the wiper arm is applied to a rear wiper device.

17. A wiper arm to be fixed to and driven by a pivot shaft for making a wiper blade wipe a windshield glass, comprising:

an arm head whose one end is to be fixed to the pivot shaft and whose other end has a holding axis;

an arm member whose one end is pivotally connected to the arm head so as to rotate about the holding axis in a direction away from the windshield glass and whose other end is to be connected with the wiper blade, the arm member enabling to rest at a position where the arm member comes in contact with the arm head, when the arm member is rotated beyond a given angle to the arm head in the direction away from the windshield glass;

a biasing member bridging between and retained by the arm head and the arm member for biasing the arm member toward the windshield glass so that the wiper blade may be pressed against the windshield glass; and a rotation restriction member attached to at least one of the arm head and the arm member, a position of the rotation restriction member relative to the at least one of the arm head and the arm member being changed over at user's choice from a first position, where the rotation restriction member restricts the rotation of the arm member relative to the arm head in the direction away from the windshield glass, to a second position, where the rotation restriction member does not restrict the rotation of the arm member relative to the arm head in the direction away from the windshield glass so that the arm member rests at the position where the arm member comes in contact with the arm head.

18. A wiper arm according to claim 17, wherein the biasing member biases the arm member toward the windshield glass, when the arm member is rotated within the given angle to the arm head, and in the direction away from the windshield glass, when the arm member is rotated beyond the given angle to the arm head, and the rotation restriction member at the first position restricts the arm member to the rotation only within the given angle to the arm head in the direction away from the windshield glass so that, even if the arm member is rotated accidentally, the arm member is returned to an original position by the biasing member and the rotation restriction member at the second position allows the arm member to rotate beyond the given angle to the arm head in the direction away from the windshield glass so that, if the arm member is manually rotated beyond the given angle to the arm head, the arm member is urged by the biasing member to rest at the position where the arm member comes in contact with the arm head.

19. A wiper arm according to claim 18, wherein a change from the first position to the second position is executed by detaching the rotation restriction member detachably attached to the at least one of the arm head and the arm member therefrom.

20. A wiper arm according to claim 19, wherein the rotation restriction member is rotatable on the at least one of the arm head and the arm member and a change from the first position to the second position is executed by changing an angular phase of the rotation restriction member relative to the at least one of the arm head and the arm member.

21. A wiper arm according to claim 19, wherein the rotation restriction member is pivotally connected to the at least one of the arm head and the arm member and a change from the first position to the second position is executed by changing an inclination angle of the rotation restriction member to the at least one of the arm head and the arm member.

* * * * *